US005923432A

United States Patent [19]

Kral

[11] Patent Number: 5,923,432

[45] Date of Patent: Jul. 13, 1999

[54] CLEANING EFFICACY REAL TIME INDICATOR

[75] Inventor: Jude A. Kral, Twinsburg, Ohio

[73] Assignee: Steris Corporation, Mentor, Ohio

[21] Appl. No.: 08/993,480

[22] Filed: Dec. 18, 1997

[51] Int. Cl.[6] .......................... G01N 21/00; D06F 33/00; B08B 3/00; B08B 9/20

[52] U.S. Cl. ......................... 356/432; 68/12.02; 134/113; 134/25.2; 134/57 D; 134/58 D

[58] Field of Search ..................... 356/432, 239.1–239.8; 134/25.2, 18, 57 D, 58 D, 113; 422/82.05, 82.06, 82.09, 105, 108; 436/43, 50, 55, 165, 172; 68/12.02; 385/12, 13

[56] References Cited

U.S. PATENT DOCUMENTS 4,559,813 12/1985 Brekelmans .
5,219,345 6/1993 Potter .
5,233,203 8/1993 Haga .
5,245,403 9/1993 Kato et al. .
5,265,446 11/1993 Kuroda et al. ......................... 68/12.02
5,411,042 5/1995 Suzuki et al. ......................... 134/57 D
5,479,252 12/1995 Worster et al. .
5,481,109 1/1996 Ninomiya et al. .

*Primary Examiner*—Robert H. Kim
*Assistant Examiner*—Amanda Merlino
*Attorney, Agent, or Firm*—Fay, Sharpe, Beall, Fagan, Minnich & McKee, LLP

[57] ABSTRACT

A cleaning efficacy indicator system (20) includes a light source (50) and a light receiver (56). A light-transmitting optical indicator element (30) receives light from the source (50) and transmits the light to the receiver (56). The receiver (56) provides at an electrical output signal (82) which varies in accordance with light received from the light source (50). The light-transmitting optical indicator element (30) is purposefully soiled on its outer surface (48) with a soiling agent to inhibit or alter its light transmitting abilities. However, upon effective washing, the indicator element (30) is able to transmit an increased light intensity. The indicator element (30) is washed with a load of soiled articles. Either during washing operations or subsequently, the light transmission through the indicator element (30) is monitored using the light output signal (82) of the light receiver (56). A select change in light transmission is indicative of effective washing operations.

20 Claims, 4 Drawing Sheets

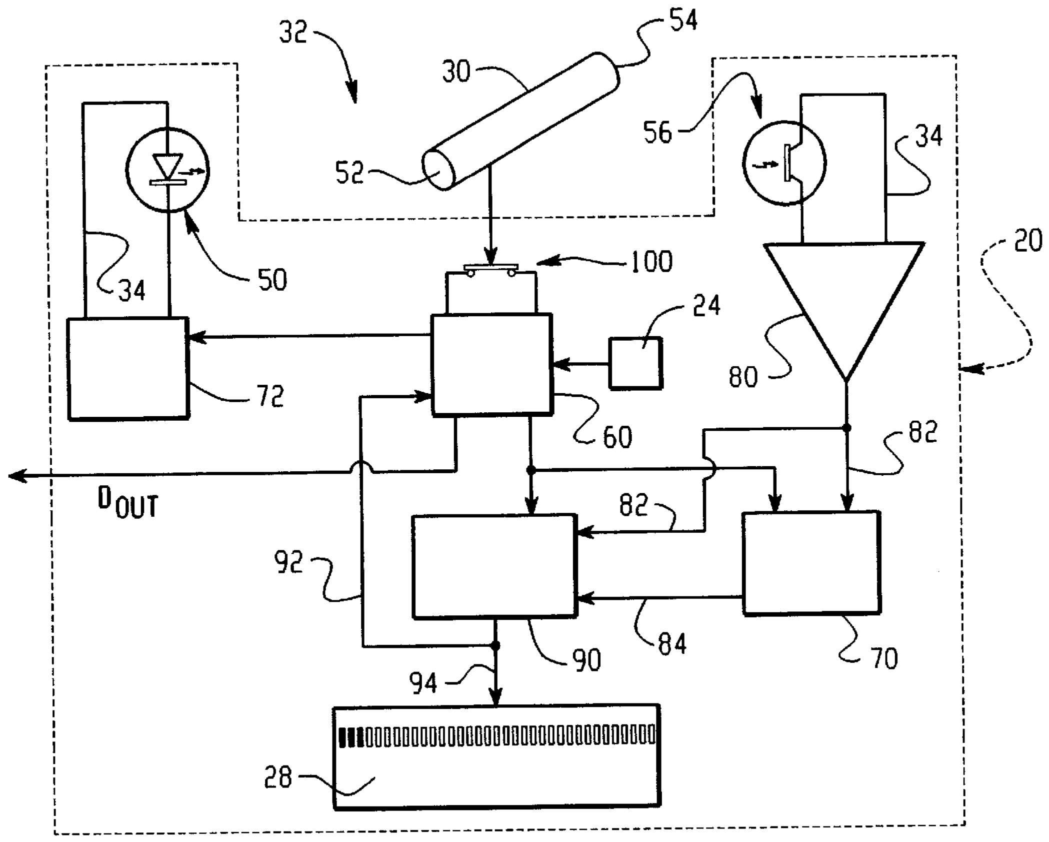
Fig. 4
Fig. 5
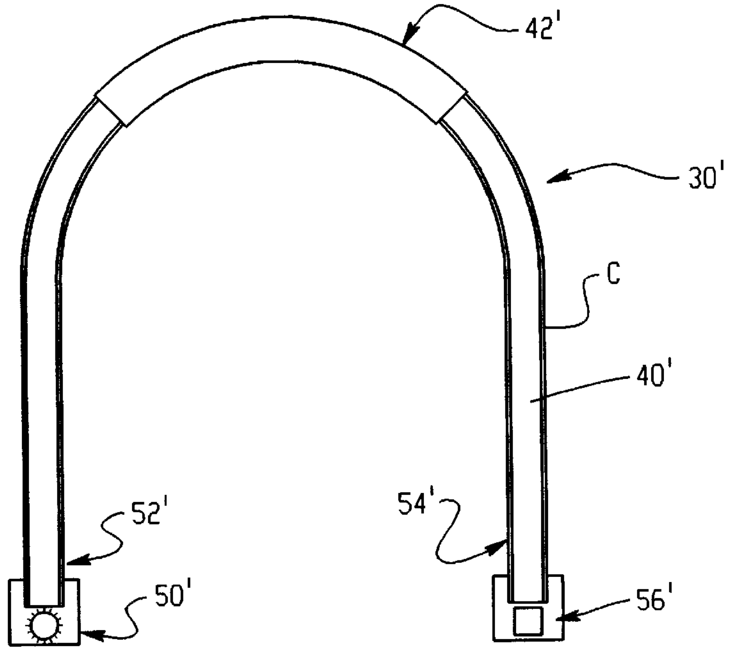

CLEANING EFFICACY REAL TIME INDICATOR

BACKGROUND OF THE INVENTION

The present invention relates to the cleaning arts. It finds particular application in conjunction with the cleaning and sterilization of medical instruments and equipment. It will be appreciated, however, that the invention is also applicable to the cleaning of other articles such as food processing equipment, pharmaceutical processing equipment, animal cages, and other equipment.

Various methods and apparatus are known for disinfecting medical instruments and devices. For example, medical instruments and other devices are commonly disinfected using high pressure steam, ethylene oxide gas, low temperature liquid anti-microbial solutions such as peracetic acid or glutaraldehyde, and vapor phase disinfectants such as vapor phase hydrogen peroxide and the like. Each of these disinfection methods has advantages, or is particularly well-suited in certain applications.

Recently, there has been an increased emphasis on the effective cleaning of post-operative debris from medical instruments and devices prior to the disinfection thereof. Likewise, in non-medical device disinfection environments, the effective cleaning of the equipment prior to its disinfection has become increasingly important. When equipment is effectively cleaned prior to disinfection, the organic load encountered by the disinfectant is reduced, thus increasing the effectiveness of the disinfectant. Also, effective cleaning prior to disinfection eliminates the result of a disinfected device or piece of equipment that includes disinfected, but unsightly and potentially dangerous debris thereon. Sterile, dead organisms are known to release toxic pyrogens as they decompose.

Most known disinfection equipment requires that the contaminated medical devices be manually precleaned before the disinfection cycle. Obviously, this labor-intensive approach is time-consuming, expensive, and exposes cleaning personnel to potentially dangerous biological and other contaminants on the equipment being cleaned. Also, the cleanliness of the equipment following the manual cleaning operations cannot be automatically verified, and obviously depends upon the technique of the person who performed the washing or other cleaning.

Therefore, devices that automatically clean and then disinfect medical and other equipment have been developed. Typically, these systems simply carry out a wash cycle for a preset duration. Cleaning is not always certain, especially when the water is not at the ideal temperature, the detergent is not at full strength, water pressure is abnormally low, the cleaning cycle is aborted due to an ineffective timing device, or if other error conditions are present.

For this reason, visual cleaning indicators have been developed that are pre-soiled with a known type and quantity of soil, and then washed with the medical device or other equipment being cleaned. Following the washing cycle and any other associated cycles, such as a disinfection cycle, the cleaning indicator is removed from the wash chamber and visually inspected by a machine operator for any indication that it was not effectively cleaned. The inspection indicates whether the medical device or other equipment was effectively cleaned. Obviously, the visual inspection process is subject to error and operator judgment. It requires a highly trained operator capable of making a subjective determination of cleaning effectiveness.

The present invention contemplates a new and improved cleaning efficacy indicator system and method, and a cleaning device incorporating the same, which automatically assesses cleaning in a real-time, cost-effective, and highly accurate manner.

SUMMARY OF THE INVENTION

In accordance with the present invention, a method of evaluating the cleaning efficacy of a washing system includes soiling an outer surface of an optical transmission element with a soiling agent to decrease light transmission through the element and thereafter washing the optical transmission element in a washing system. During or after a wash cycle, light is passed from a source into the optical transmission element and received therefrom. The intensity of light received from the washed optical transmission element is compared with a reference light intensity passed from the source through an effectively washed optical transmission element.

In accordance with another aspect of the present invention, a cleaning efficiency indicator element includes a light-transmitting core and a porous coating over at least a substantial portion of an outer surface of the core. A soiling agent is retained in the porous coating to alter light transmission through the core.

In accordance with a further aspect of the present invention, a cleaning efficiency indicator system includes a light source. A light receiver provides a light output signal which varies in accordance with the light received from the light source. A light-transmitting optical element is positioned between the light source and the light receiver and transmits light from the source to the receiver. The optical element alters light transmitted therethrough when unwashed relative to when washed. A comparator compares the light intensity signal with a light reference value.

In accordance with another aspect of the invention, a washing apparatus includes a washing chamber for receiving a load to be washed. Cleaning means are provided in the washing chamber to act on and clean soil from a load positioned in the washing chamber. The washer also includes a cleanliness indicator system for verifying load cleaning. The cleanliness indicator system includes a socket in the washing chamber for receiving a light-transmitting optical element including a wash removable soiling agent on an outer surface to alter light transmission through the optical element. The indicator system further includes an illumination source for transmitting light into a light-transmitting optical element positioned in the socket and means for receiving light from the light transmitting means through the light-transmitting optical element. The light receiving means provides a variable light output signal in accordance with the light received from the light transmitting means so that the light output signal varies as the wash removable soiling agent on the light-transmitting optical element is removed by the cleaning means within the chamber.

One advantage of the present invention is the provision of a real time cleaning efficacy indicator.

Another advantage of the present invention is that it automatically assesses cleaning effectiveness and efficiency, without requiring subjective operator judgment.

Still another advantage of the present invention is that it is either incorporated into a cleaning apparatus to monitor, control, and/or verify cleaning operations, or is provided as a separate stand-alone device usable with any conventional cleaning device.

Yet another advantage of the present invention is that it can dynamically adjust the cleaning cycle of a cleaning device to continue as necessary to effect full cleaning of the medical devices or other load contained in the cleaning device.

A further advantage of the present invention is that cleaning effectiveness is easily documented for internal or other permanent records.

A still further advantage of the present invention is that it provides an indication of when a cleaning device is in need of service.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components and in various steps and arrangements of steps. The drawings are only for purposes of illustrating preferred embodiments and are not to be construed as limiting the invention.

FIG. 4 diagrammatically illustrates the structure and operation of a cleaning efficacy indicator system in accordance with the present invention;

FIG. 5 illustrates an alternative optical cleaning efficacy indicator element in accordance with the present invention and, FIG. 6 graphically illustrates cleaning efficacy determination test results utilizing a cleaning efficacy indicator element in accordance with the present invention.

DETAILED DESCRIPTION OF THE PREFERRED EMBODIMENTS

In general, a cylindrical glass fiber, rod, or other element will transmit light along its length if its outer surface is surrounded by a medium with a lower refractive index. Light within the element which strikes the surrounding layer below a critical angle is internally reflected and continues along the fiber optic element. However, any change in the surrounding medium, such as debris on the surface of the element, or any contact of the element with adjacent elements or other objects will disturb the boundary condition and alter the amount of internal reflection occurring at that point on the surface. These conditions typically result in leakage of light from the element, a loss in transmission, and the transfer of light from the element to other objects with which it comes in contact. To prevent this and to ensure a proper boundary surface, glass fibers used for fiber optics are typically clad with a very thin layer of cladding glass or plastic. The cladding has a lower refractive index than the core, thus ensuring total internal reflection.

A light ray traveling along a fiber optic element travels through the core and strikes the side surface at an angle of incidence. It is internally reflected at an angle of reflection. It undergoes a second reflection at second point and continues onward down the fiber length, reflecting each time it hits the boundary surface between the core and the cladding. As the angle of incidence increases, the angle of internal reflection correspondingly increases until the angle of incidence equals the “critical angle” for internal reflection. At angles greater than the critical angle, light will not be reflected but will instead pass through the side of the fiber.

In practice, not all light entering the fiber optic element is transmitted therethrough to exit at the opposite end of the element. Light transmission is decreased by the following factors: (1) absorption by the core glass; (2) inherent inefficiencies that cause minor refraction or scattering of light upon each reflection which are amplified over the length of the fiber; and, (3) losses at the surface of both ends of the fiber, i.e., not all of the light will actually enter the fiber.

Figure 1:
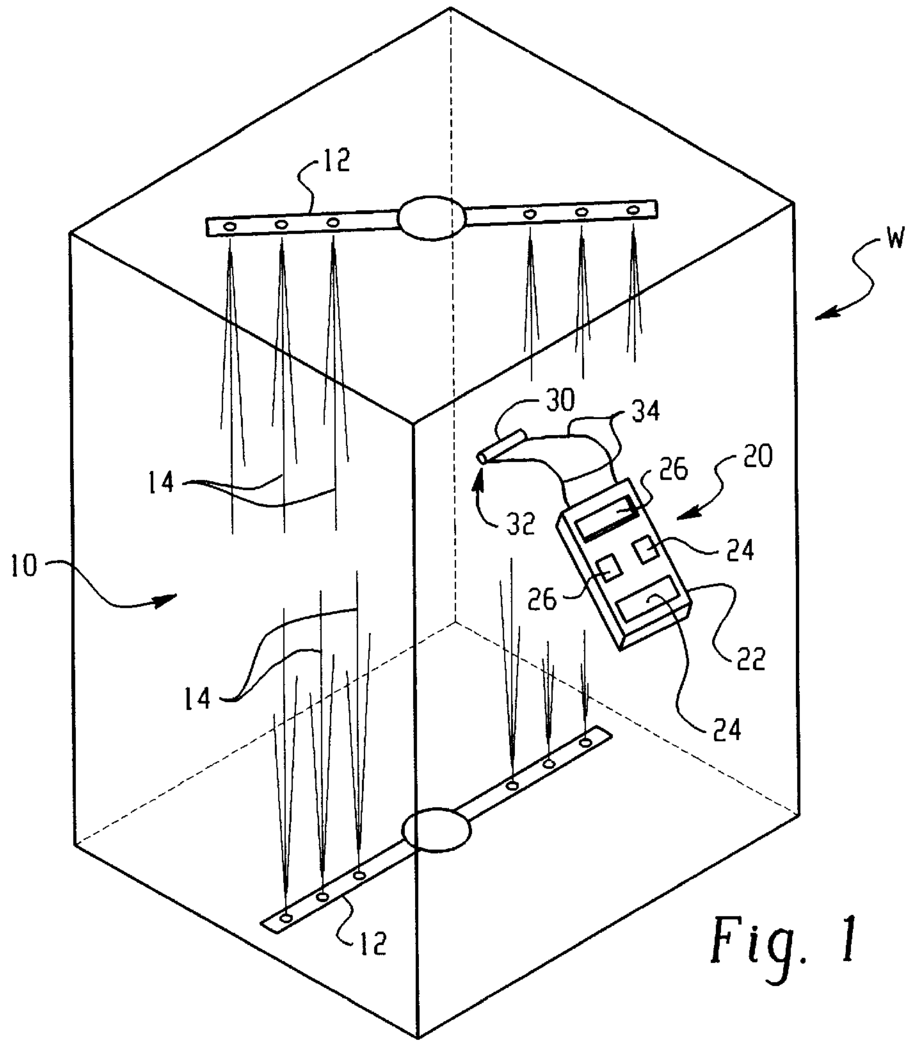
FIG. 1 diagrammatically illustrates a washing apparatus incorporating a cleaning efficacy indicator system in accordance with the present invention.

With this in mind, the present invention exploits these characteristics of optical transmission elements to provide a real time cleaning efficacy indicator element and system. With initial reference to FIG. 1, a washing device W used for cleaning medical devices and equipment, manufacturing devices and equipment, and any other articles defines a washing chamber 10 that receives the load to be washed. One or more spray heads 12 are supplied with a high pressure cleaning solution and generate a high pressure spray 14 throughout the chamber 10 to clean debris from the load.

The washing device W incorporates at an optical cleaning efficiency or efficacy indicator system 20. The system 20 includes the system controller 22 which comprises a system control circuit and other elements as described below. The controller also includes input devices 24 for operator control of the indicator system 20, and one or more output devices 26, including visual displays, printers, and audible devices, for supplying at an operator with output indicative of cleaning efficiency.

A light-transmitting optical cleaning efficacy element 30 is positioned in the washing chamber 10 in a receiving socket 32 of the indicator system 20. The socket 32 is electrically or optically connected to the controller 22 through one or more electro-optical connections 34. The socket 32 is positioned so that the optical element 30 is acted upon and cleaned by the high pressure streams 14 and any other cleaning systems of the washer W, preferably in the same manner as the load being cleaned. In this manner, the element 30, which is soiled with a known type and amount of a soiling agent, is cleaned with the load. As is described in detail below, the system 20 monitors the light transmission properties, hence the cleaning of the element 30, and is thus able to assess the cleaning efficiency and/or efficacy of the washer W. When the element 30 is sufficiently clean, the load in the washer W is also assessed as clean.

Figure 2:
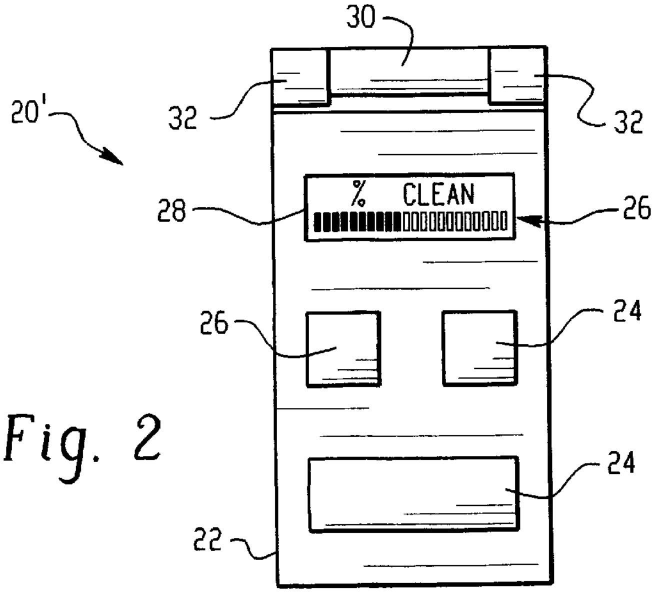
FIG. 2 diagrammatically illustrates a self-contained and portable cleaning efficacy indicator system in accordance with the present invention.

In FIG. 2, the optical cleaning efficacy indicator system is shown at 20' as a portable, self-contained apparatus, separate from a washer W or other cleaning device. The system 20' is otherwise similar in all respects to the system 20. With the self-contained system 20', a pre-soiled optical cleaning efficacy indicator element 30 is placed in a washing device with the load being cleaned. After the washing operations are completed, the indicator element is removed from the washing device and optically coupled in the socket 32 so that the system 20' is able to determine its cleanliness. If it is determined to be sufficiently clean, at an operator is able to assume that the remainder of the load is also clean.

As is seen most clearly in FIG. 3, the input devices 24 are provided as switches, dials, keypads, and the like for use by at an operator in controlling the operation of the system 20,20'. For example, using the devices 24, an operator is able to turn the system on/off, test the system, program the system with cleanliness set-points, and perform any other such operations. Also, the output devices 26 of the system 20,20' preferably includes a visual display 28 such as a light-emitting diode (LED) display, a liquid-crystal display (LCD), at an analog display, or any other suitable visual display. As shown herein, the display 28 does not merely provide a clean or not clean indication, but preferably provides in indication of the relative cleanliness of the element 30.

With the washer integrated system 20, the display 28 is updated in real-time, so that an operator is able to monitor the progress of the cleaning operations. Also, the washer integrated system 20 is preferably electrically tied to the washer control system so that washing operations can be varied depending upon cleaning. The output devices 26 may optionally include a speaker or the like that generates different audible tones indicative of cleanliness.

Figure 3A:
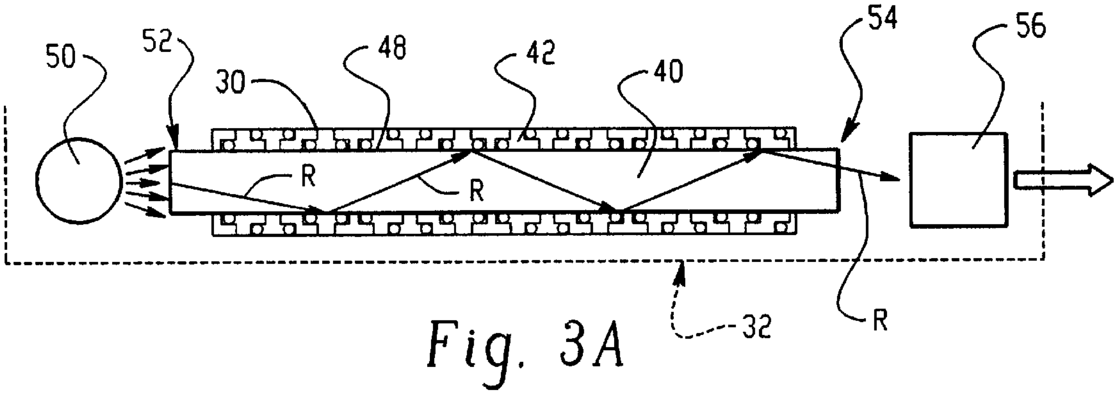
FIG. 3A diagrammatically illustrates the operation of an optical cleaning efficacy indicator element in accordance with the present invention.
Figure 3B:
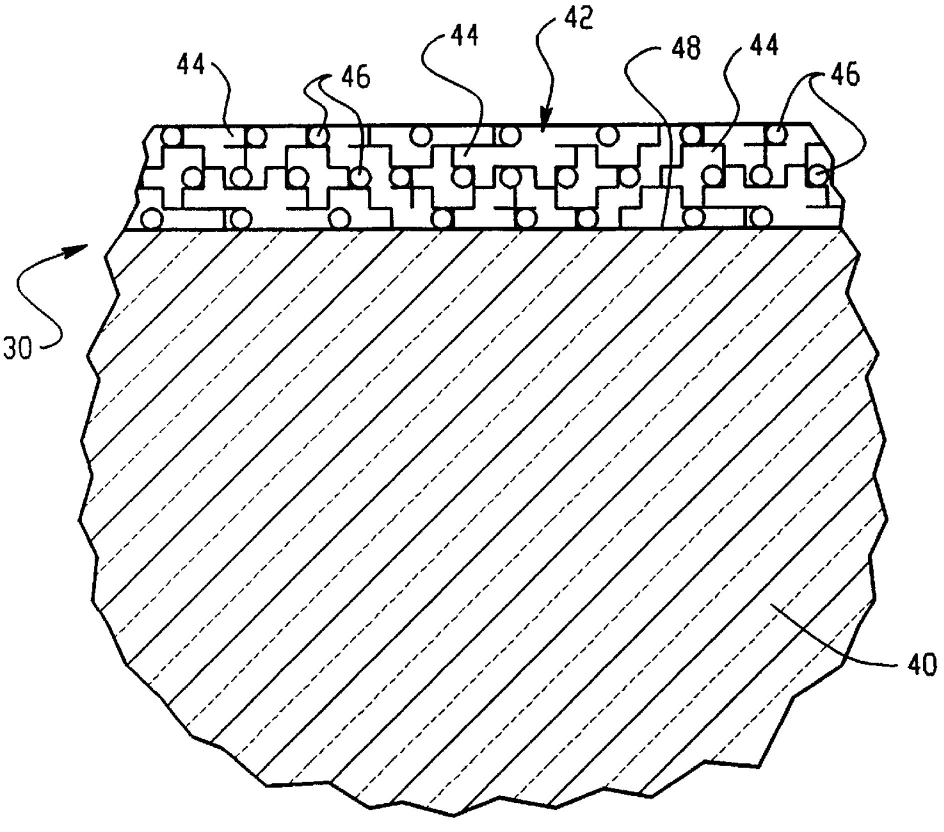
FIG. 3B is an enlarged, partial cross-sectional view of an optical cleaning efficacy indicator element in accordance with a preferred embodiment of the present invention.

With reference now to FIGS. 3A and 3B, the element 30 includes at an optically transmitting core 40 having at an outer sheath or coating of a porous media 42 in contact with at least a portion of the outer surfaces of the core 40. In the preferred embodiment, the core 40 is made from glass or plastic, e.g., clear acrylic, and is provided in the form of a cylindrical rod which is surrounded by a sheath of Porex® brand high density polyethylene based open-celled porous media available commercially from Porex Technologies Corp., Fairburn, Georgia 30213. Rigid open-celled foams that are moldable and/or machinable into any necessary shape are particularly advantageous. For example, in one embodiment, the core 40 is 0.255 inch diameter, 1.49 inch long clear acrylic or glass rod, surrounded by a 1/16 inch to ½ inch thick sheath (most preferably ⅛ inch to ¼ inch thick) of Porex brand high density polyethylene foam having open-celled pores 44 (FIG. 4B) with at an average pore size of 70 $\mu$m–130 $\mu$m, preferably 70 $\mu$m–80 $\mu$m. Alternatively, the core 40 is provided in a flat plate configuration including the porous media 42 on at least one surface thereof. Of course, the element 30 may be provided in many different shapes and sizes, and using a wide variety of different materials for the core 40 and sheath 42. The invention is not meant to be limited to any particular size, shape, or type of materials for the element 30.

As mentioned, the porous media 42 of the optical indicator element 30 is purposefully soiled. FIG. 3B illustrates soil particles 46 embedded in the pores 44 of the media 42, so that the outer surface 48 of the core 40 is contacted not only by the porous media 42, but also by the soil particles 46. In accordance with the above discussion on fiber optics, those skilled in the art will recognize that the presence of the porous media 42 and the soil particles 46 in contact with the core outer surface 48 will alter the ability of the core 40 to transmit light rays R from a light source 50 in the socket 32 through a first face or end 52 of the element 30, through the core 40, to a spaced second face or end 54 of the element 30 to be received by a light receiver 56. Most typically, soil particles have at an index of refraction which causes light rays to escape from the rod rather than be reflected. Thus, the dirtier the sleeve 42, the higher the percentage of light rays that escape. However, as the soil particles are washed out of the media 42 and away from the surface 48, light transmission through the element 30 from the source 50 to the receiver 56 is increased. Other media 42 are also contemplated. For example, the media can be a sleeve of flexible, open-celled material that is frictionally received over the rod. The external surface of the optical element may be roughened and treated directly with a soiling agent. Alternatively, a length of optical fiber can have a section of the cladding material chemically or mechanically removed or altered. This section is covered by at an open-celled covering such as sintered glass, ceramic, or metal, plastic, glass, or ceramic foam, a woven or non-woven fiber mat, napped or flocked surfaces, and the like. FIG. 5 illustrates one example of a non-linear indicator element 30' including a rigid U-shaped optical element including a suitable cladding C. A first end 52' of the element 30' is received in a plug-in socket of a light source 50' while the second end 54' is received in a plug-in socket of a light receiver 56'. The cladding C is removed over at least a portion of the element 30' and replaced with the porous media 42'. The element 30' is similar in all other respects with the element 30.

In particular, the optical indicator element 30 is purposefully soiled to reduce its efficiency in transmitting light rays R. However, as it is cleaned during washing operations, the amount of light passing therethrough correspondingly increases. Although a great variety of soiling agents may be used, when the efficacy indicator system 20,20' is used as a cleaning efficiency indicator for medical device or equipment washers, or in other applications where the load to be washed includes biological waste thereon, the preferred soiling agent comprises Edinburgh Soil as is generally known in the art. Other suitable soiling agents include inks, dyes, blood, mucous, feces, saliva, bile, and any other washable coating. The preferred soiling agents ensure that the indicator element 30 is as difficult or more difficult to clean than the load of medical instruments and devices, or other equipment. For example, it has been found that a soiling load of 0.5 milliliters to 1.0 milliliters of Edinburgh Soil is a suitable soil load for at an optical indicator element 30 having the dimensions described above. Furthermore, while a wide variety of suitable porous coatings 42 may be used, open-celled polyethylene foam which has pore sizes ranging from 7 $\mu$m–130 $\mu$m presents a cleaning challenge which ensures that the element 30 does not become clean while the load of articles being washed in the washer W remains soiled. Preferred porous media present a cleaning challenge by retaining the soil, and also cause the soil to be wicked inward into contact with the core surface 48.

Referring now also to FIG. 4, a microcontroller 60, such as any suitable electronic controller, controls all operations of the system 20 as described herein. The controller 60 receives input from the operator input devices 24. Likewise, the controller 60 is connected to the visual output display 28. As shown herein, the display 28 is a bar-type display that becomes increasingly illuminated as the element 30 is cleaned. When the element 30 is sufficiently clean to terminate washing operations or to allow subsequent disinfection or other operations to proceed, the controller 60 changes the state of a digital output line $D_{OUT}$ which is tied into the washer control system or any other device.

The system 20 includes a history memory 70 which is programmable by the controller 60 (in accordance with operator input) with a cleanliness set-point, i.e., a minimum level of cleanliness of the element 30 that must be achieved to indicate a clean load in the washing device. The controller 60 is connected to a light source driver circuit 72 which, in turn, drives the light source 50, such as a light emitting diode or any other suitable light emitting element or circuit, located at a first side of the socket 32. The light receiving element 56 located at the opposite side of the socket 32 receives light from the source 50 through the element 30. Suitable light receiving elements include a phototransistor or other suitable element or circuit that provides a variable electrical output as the amount or intensity of light received thereby changes. The light receiver 56 provides input to at an amplifier 80. The amplifier supplies at an electrical signal 82 to the history memory 70 to indicate the present cleanliness level of the optical indicator element 30. Preferably, the memory 70 maintains a record of cleaning progress for each cleaning operation for later retrieval and output as needed. Optionally, other light source and detector combinations may be utilized. For example, the light source may include a plurality of wavelength specific sources, e.g., an IR source and a UV source. The light receiver may include spectrum specific receivers, e.g., an IR sensitive receiver and a UV sensitive receiver. The output of the amplifier circuit 80 is indicative of a change in the relative spectrum of the transmitted light, e.g., differentially connected to the IR and UV receivers. If the soil includes a phosphor, shifts in spectral components can be measured with cleanliness. Also, those or ordinary skill in the art will recognize that the light source and light receiver of the present invention need not be located at opposite sides or ends of at an optical indicator element 30,30'. Instead, the source and receiver may be located at the same side or end of at an indicator element, with a mirror or the like used to reflect light from the source to the receiver.

The cleanliness signal 82 is periodically input to a comparator 90 together with the set-point signal 84 from the memory 70. The comparator 90 compares the current cleanliness signal 82 with the minimum cleanliness set-point value, and provides either a "high" or "low" digital voltage signal to the controller 60 to indicate that cleaning is or is not satisfactory. The comparator 90 also outputs a signal 94 to the visual display 28 which varies depending upon the proximity of the cleanliness signal 82 to the set-point signal 84 so that the display 28 accurately displays cleaning progress. Once the element 30 is sufficiently clean that the light passing therethrough from the source 50 to the receiver 56 causes the signal 82 to satisfy the set-point condition, the state of the signal $D_{OUT}$ is altered by the controller 60 to indicate successful cleaning.

A normally open switch 100 is provided in the socket 32. The operation of the system 20 is not possible when the switch 100 is open. Upon the proper insertion of at an optical cleaning element 30, the switch 100 is urged closed to allow operation of the system. Suitable non-contact switching or sensing means may alternatively be used to sense the presence of the indicator element 30 in the socket 32. Also, those of ordinary skill in the art will recognize that the interface between the indicator element 30 and the system 20,20' may comprise fiber optic elements rather than electrical connections to improve reliability.

Figure 6:
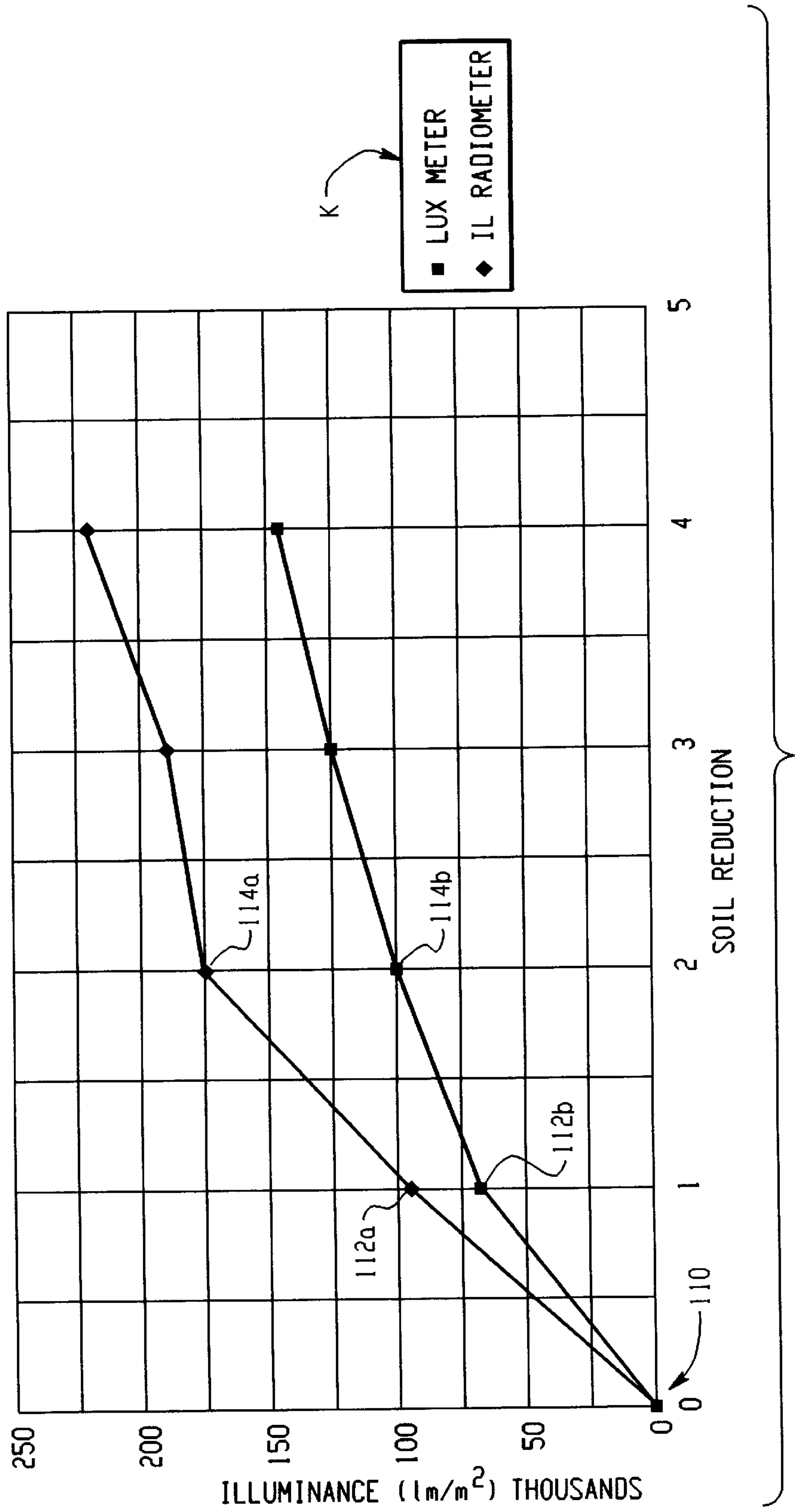

FIG. 6 graphically illustrates the increased light transmission of at an optical indicator element 30, as measured by both a Lux Meter and at an Illuminance (IL) Radiometer as indicated by the appropriate symbols in the graph key K. Complete absence of light transmission is illustrated at the origin point 110. Soil Reduction Condition "1" on the horizontal axis corresponds to a soiled element 30 before any cleaning thereof. Soil Reduction Condition "2" corresponds to an effectively washed element 30. Soil Reduction Condition "3" corresponds to an unsoiled element 30, i.e., before soiling of the porous coating 42, and Soil Reduction Condition "4" corresponds to an uncoated element 30, i.e., the core 40 alone. It can be seen upon examining FIG. 6 that the transmission of light through the element 30 increases during cleaning of the initially soiled element (Soil Reduction Condition "1") from points 112*a*,112*b* until it is fully cleaned for a particular application (Soil Reduction Condition "2") as indicated at points 114*a*,114*b*. Of course, the particular level of cleanliness required for any particular application, i.e., the location of Soil Reduction Condition "2" can be varied, depending upon the characteristics of the soiled load being cleaned, and the degree of cleanliness required. For example, laboratory animal cages or bed pans need not be cleaned as rigorously as invasive medical instruments.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method of evaluating cleanliness in a washing system, the method comprising:

a) soiling an outer surface of an optical transmission element with a soiling agent to decrease light transmission through the element;

b) washing the optical transmission element in a washing system;

c) passing light from a source into the optical transmission element at least one of during and after a washing cycle;

d) receiving light from the optical transmission element;

e) comparing the intensity of light received from the optical transmission element with a reference light intensity indicative of light passed from the source through an effectively washed optical transmission element.

2. The method of evaluating cleanliness in a washing system as set forth in claim 1 wherein the step of soiling an optical transmission element includes treating the outer surface of the element with at least one of Edinburgh Soil, ink, dye, blood, mucous, feces, saliva, and bile.

3. The method of evaluating cleanliness in a washing system as set forth in claim 2 wherein the soiling step includes at least substantially coating the outer surface of the optical transmission element with an open-celled porous media and depositing the soiling agent into cells of the porous media.

4. The method of evaluating cleanliness in a washing system as set forth in claim 1 wherein steps (c), (d), and (e) are repeatably carried out during step (b), and wherein the method further includes:

f) providing an operator with a real-time indication of cleanliness.

5. The method of evaluating cleanliness in a washing system as set forth in claim 1 further comprising, after step (e):

f) providing an operator with at least one of a visual and an audio indication of cleanliness achieved by the washing system.

6. A cleaning efficacy indicator element comprising:

a light-transmitting core;

a porous coating covering at least a substantial portion of an outer surface of the core; and a soiling agent in the porous coating to alter light transmission through the core.

7. The cleaning efficacy indicator element as set forth in claim 6 wherein the core is one of a cylindrical rod and a substantially flat plate member.

8. The cleaning efficacy indicator element as set forth in claim 6 wherein the core includes at least one of clear glass and acrylic plastic.

9. The cleaning efficacy indicator element as set forth in claim 6 wherein the porous coating includes an open-celled polyethylene material having at an average pore size in the range of 7 $\mu$m–130 $\mu$m.

10. A cleaning efficacy indicator system comprising:

a light source;

a light receiver providing a light output signal which varies in accordance with light received from the light source;

a light-transmitting optical element positioned between the light source and the light receiver and transmitting light from the source therethrough, the optical element altering the transmitted light when unwashed relative to when washed;

a comparator for comparing the light output signal with a reference value.

11. The cleaning efficacy indicator system as set forth in claim 10 wherein the light source includes a light emitting diode.

12. The cleaning efficacy indicator system as set forth in claim 10 wherein the light transmitting optical element includes a light transmitting core including a soil retaining outer coating along at least a segment thereof.

13. The cleaning efficacy indicator system as set forth in claim 12 wherein the soil retaining outer coating includes porous polyethylene.

14. The cleaning efficacy indicator system as set forth in claim 13 wherein the core includes at least one of glass and clear acrylic plastic and wherein the porous polyethylene has an average pore size in the range of 7 $\mu$m–130 $\mu$m.

15. The cleaning efficacy indicator system as set forth in claim 14 wherein the core is one of a rod and a flat plate.

16. The cleaning efficiency indicator system as set forth in claim 10 further comprising:

a visual display providing an operator with a visual indication of the cleanliness of the light transmitting optical element.

17. The cleaning efficacy indicator system as set forth in claim 16 wherein the comparator compares the light output signal with a set-point value indicative of cleanliness of the light-transmitting optical element.

18. The cleaning efficacy indicator system as set forth in claim 17 further including:

a history memory for storing light output signals from the light receiver.

19. The cleaning efficacy indicator system as set forth in claim 17 further including:

a microcontroller connected to receive input from the comparator and providing a digital output signal indicating a clean light-transmitting optical element when the light intensity output signal from the light receiver satisfies the set-point value.

20. A cleanliness indicator system for a washing apparatus including a washing chamber for receiving a load to be washed and cleaning means within the washing chamber to act on and clean soil from a load positioned in the washing chamber, said cleanliness indicator system including:

a socket in the washing chamber for receiving a light-transmitting optical element including a wash removable soiling agent on an outer surface of at least a portion thereof to alter light transmission through the optical element;

an illumination source for transmitting light into the light-transmitting optical element received in the socket; and, means for receiving light from the light transmitting means which has passed through the light-transmitting optical element, said receiving means providing a variable light output signal in accordance with light received from the light transmitting means, whereby said light output signal varies as the wash removable soiling agent on the light-transmitting optical element is removed by the cleaning means within the chamber.

* * * * *